US011218464B2

(12) United States Patent
Sun

(10) Patent No.: US 11,218,464 B2
(45) Date of Patent: Jan. 4, 2022

(54) INFORMATION REGISTRATION AND AUTHENTICATION METHOD AND DEVICE

(71) Applicant: ADVANCED NEW TECHNOLOGIES CO., LTD., Grand Cayman (KY)

(72) Inventor: Yuanbo Sun, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 489 days.

(21) Appl. No.: 15/925,144

(22) Filed: Mar. 19, 2018

(65) Prior Publication Data

US 2018/0212954 A1 Jul. 26, 2018

Related U.S. Application Data

(63) Continuation of application No. PCT/CN2016/098815, filed on Sep. 13, 2016.

(30) Foreign Application Priority Data

Sep. 21, 2015 (CN) .......................... 201510604244.5

(51) Int. Cl.
*H04L 29/06* (2006.01)
*H04L 9/14* (2006.01)
(Continued)

(52) U.S. Cl.
CPC ........ *H04L 63/0823* (2013.01); *H04L 9/0825* (2013.01); *H04L 9/14* (2013.01);
(Continued)

(58) Field of Classification Search
CPC ..... H04L 63/0823; H04L 9/0825; H04L 9/14; H04L 9/32; H04L 9/3247; H04L 9/3263
See application file for complete search history.

(56) References Cited

U.S. PATENT DOCUMENTS 5,799,086 A * 8/1998 Sudia ................. G06Q 20/3821
705/76
7,152,782 B2 12/2006 Shenker et al.
(Continued)

FOREIGN PATENT DOCUMENTS

CN 101771535 A 7/2010
CN 101778380 A 7/2010
(Continued)

OTHER PUBLICATIONS

Supplementary Search dated Sep. 29, 2019, issued in Chinese Application No. 201510604244.5 (2 pages).
(Continued)

*Primary Examiner* — Kevin Bechtel
*Assistant Examiner* — Forrest L Carey

(57) ABSTRACT

The present application discloses methods and devices for information registration and authentication. The registration method may comprise: sending a request for registering standard information to an authentication server; receiving first authentication information fed back by the authentication server; generating a standard information acquisition request, sending the standard information acquisition request and the first authentication information to a first application, and acquiring signed standard information and an identity identifier of the standard information that are returned by the first application after the first application approves authentication of the first authentication information, wherein the signed standard information is signed by the first application using second authentication information; and sending the signed standard information, the identity identifier of the standard information, and the first authentication information to the authentication server.

19 Claims, 11 Drawing Sheets

(51) Int. Cl.
    *H04L 9/32*    (2006.01)
    *H04L 9/08*    (2006.01)

(52) U.S. Cl.
    CPC .............. *H04L 9/32* (2013.01); *H04L 9/3247* (2013.01); *H04L 9/3263* (2013.01)

(56) References Cited

U.S. PATENT DOCUMENTS

| | | |
|---|---|---|
| 7,159,180 B2 | 1/2007 | Ward |
| 7,337,976 B2 | 3/2008 | Kawamura et al. |
| 7,650,505 B1 | 1/2010 | Masurkar |
| 7,860,486 B2 | 12/2010 | Frank et al. |
| 8,118,218 B2 | 2/2012 | Koh et al. |
| 8,171,137 B1 | 5/2012 | Parks et al. |
| 8,171,525 B1 | 5/2012 | Pelly et al. |
| 8,312,284 B1 | 11/2012 | Zheng |
| 9,734,496 B2 | 8/2017 | Nahari |
| 2003/0105725 A1 | 6/2003 | Hoffman |
| 2006/0165060 A1 | 7/2006 | Dua |
| 2008/0019573 A1 | 1/2008 | Baltatu et al. |
| 2008/0215890 A1* | 9/2008 | Buer .............. H04L 9/3231 713/186 |
| 2008/0263630 A1 | 10/2008 | Harada et al. |
| 2010/0100945 A1 | 4/2010 | Ozzie et al. |
| 2010/0138905 A1 | 6/2010 | Kass |
| 2010/0211507 A1 | 8/2010 | Aabye et al. |
| 2010/0291896 A1 | 11/2010 | Corda |
| 2011/0029671 A1 | 2/2011 | Deprun et al. |
| 2011/0078081 A1 | 3/2011 | Pirzadeh et al. |
| 2011/0113473 A1 | 5/2011 | Corda et al. |
| 2011/0265159 A1* | 10/2011 | Ronda .............. H04L 9/3263 726/6 |
| 2012/0129452 A1 | 5/2012 | Koh et al. |
| 2014/0189809 A1 | 7/2014 | Koved et al. |
| 2014/0380059 A1 | 12/2014 | Kaplan |
| 2018/0302221 A1 | 10/2018 | Lu et al. |
| 2018/0359241 A1* | 12/2018 | Brockhaus .......... H04L 63/062 |

FOREIGN PATENT DOCUMENTS

| | | |
|---|---|---|
| CN | 101997824 A | 3/2011 |
| CN | 102217277 A | 10/2011 |
| CN | 104010044 A | 8/2014 |
| CN | 104023032 A | 9/2014 |
| CN | 104636666 A | 5/2015 |
| CN | 104767616 A | 7/2015 |
| CN | 104917766 A | 9/2015 |
| JP | 2004-348308 A | 12/2004 |
| JP | 2005-236505 A | 9/2005 |
| JP | 2012-044670 A | 3/2012 |
| JP | 2013-122680 A | 6/2013 |
| KR | 10-1446504 B1 | 11/2014 |
| RU | 2524868 C2 | 8/2014 |
| WO | 2007/001046 A1 | 1/2007 |

OTHER PUBLICATIONS

Second Office Action for Chinese Application No. 201510604244.5 dated Oct. 14, 2019 with English machine translation (40 pages).
Extended European Search Report dated Apr. 12, 2019 issued in European Application No. 16848029.1 (9 pages).
"Information technology—Security techniques—Biometric template protection Project: 24745; SC 27 N7243", ITU-T Draft; Study Period 2009-2012, International Telecommunication Union, Geneva; CH, vol. Study Group 17, Aug. 5, 2009, [retrieved on Aug. 5, 2009] (60 pages).
Palon et al., "Attestation-Based Remote Biometric Authentication", Biometric Consortium Conference, 2006 Biometrics Symposium: Special Session On Research At the IEEE, PI, Sep. 1, 2006 (5 pages).
International Search Report and Written Opinion for Application No. PCT/CN2016/098815, dated Dec. 6, 2016, 8 pages.
Australian Examination Report No. 1 dated Mar. 13, 2019, issued in Australian Application No. 2016325979 (3 pages).
Office Action dated Mar. 19, 2019, issued in Japanese Application No. 2018-515096 (13 pages).
Office Action for Korean Application No. 10-2018-7011150 dated May 21, 2019 (23 pages).
Second Examination Report for Australian Application No. 2016325979 dated Jun. 17, 2019 (3 pages).
PCT International Preliminary Report on Patentability dated Apr. 5, 2018, issued in related International Application No. PCT/CN2016/098815 (12 pages).
Decision on Grant and Search Report dated Jan. 14, 2019, issued in Russian Application No. 2018109732 (37 pages).
First Office Action dated Feb. 2, 2019, issued in Chinese Application No. 201510604244.5 (10 pages) with English machine translation.
First Search Report dated Jan. 23, 2019, issued in Chinese Application No. 201510604244.5 (2 pages).
Examination Report for European Application No. 16848029.1 dated Feb. 14, 2020 (4 pages).
Third Office Action for Chinese Application No. 201510604244.5 dated Jan. 10, 2020 (45 pages).
Office Action for Indonesian Application No. P00201801923 dated Apr. 29, 2020.
Examination Report for European Application No. 16848029.1 dated Apr. 30, 2020.
First Examination Report for Indian Application No. 201847008088 dated May 28, 2020.
Office Action for Japanese Application No. 2020-006210 dated Mar. 23, 2021.

* cited by examiner

S601: Receiving a to-be-authenticated information acquisition request from a second application and carrying first authentication information

S602: Authenticating the first authentication information, and after the authentication is approved, sending the to-be-authenticated information and an identity identifier of the to-be-authenticated information to an authentication server via the second application, to cause the authentication server to authenticate the first authentication information, the to-be-authenticated identity identifier, and the to-be-authenticated information, generate an authentication result, and feed the authentication result back to the second application

FIGURE 6

INFORMATION REGISTRATION AND AUTHENTICATION METHOD AND DEVICE

CROSS-REFERENCE TO RELATED APPLICATIONS

The present application is a continuation application of the International Application No. PCT/CN2016/098815, filed Sep. 13, 2016, which is based on and claims priority to the Chinese Application No. 201510604244.5, filed Sep. 21, 2015. The entire contents of the above referenced applications are incorporated herein by reference.

TECHNICAL FIELD

The present application relates to the field of computer technologies, and in particular, to a method and a device for information registration and authentication.

BACKGROUND

Along with the development of information technologies, a user may conveniently and rapidly receive various business services via application programs (hereinafter the "business applications") by service providers (e.g., software developers, websites, etc.) installed on a terminal (e.g., a cell phone, a tablet computer, etc.). With regard to business services provided in the business applications, some types of business services have relatively high security levels, such as payment services, transfer services, and the like. Business services with relatively high security levels usually require a user to provide corresponding security information (e.g., password, biometric information, and the like), and the business services can be completed only after the security information provided by the user has been authenticated.

For the above business service that requires a user to provide security information, security information of the user would be typically acquired, as standard information (the standard information will be used as an authentication criterion in the subsequent authentication process) before the user uses the business service for the first time, for comparison with security information subsequently input by the user. In the process of acquiring the security information of the user, a business application needs to use a security information application in the terminal (e.g., a bioinformatics management application in charge of collecting and storing biometric information input by a user, and the bioinformatic management application is installed in the terminal by a terminal manufacturer) to acquire security information of the user.

To facilitate application invocation and information transmission between a business application and a security information application, a terminal system (e.g., an Android M system) in prior art runs a security information application in an architecture referred to as Rich Execution Environment (REE). REE possesses plenty invocation support, such that the security information application running in REE can be more conveniently and rapidly invoked by various business services, and can more conveniently and rapidly transmit information required by all business applications.

However, REE is not a secure environment. In a process of information transmission between a security information application and a business application, the security information tends to be intercepted and tampered with by an unlawful operator during transmission. For standard information, in particular, it is impossible to identify whether the standard information is true or false as the service provider has not previously saved the standard information provided by the user. Once the standard information is tampered with during transmission, the service provider would still receive the tampered standard information as an authentication criterion in the subsequent authentication process. Obviously, this will induce the unlawful operator to acquire various business services in the name of the user.

SUMMARY

The disclosed methods, devices, and storage medium for information registration and authentication can at least mitigate the challenges in existing technologies of having inadequate security when security information is used for registration.

According to one aspect, an information registration method may comprise: sending a request for registering standard information to an authentication server; receiving first authentication information fed back by the authentication server; generating a standard information acquisition request, sending the standard information acquisition request and the first authentication information to a first application, and acquiring signed standard information and an identity identifier of the standard information that are returned by the first application after the first application approves authentication of the first authentication information, wherein the signed standard information is signed by the first application using second authentication information; and sending the signed standard information, the identity identifier of the standard information, and the first authentication information to the authentication server, to cause the authentication server to register the standard information and the identity identifier of the standard information after the authentication server approves authentication of the first authentication information and approves authentication of the second authentication information according to the signed standard information. In some embodiments, a non-transitory computer-readable storage medium may store instructions that, when executed by a processor, cause the processor to perform the above-described information registration method.

According to another aspect, an information registration method may comprise: receiving first authentication information and a standard information acquisition request from a second application; and authenticating the first authentication information, and after the authentication is approved, returning standard information signed by using second authentication information and returning an identity identifier of the standard information back to the second application, to cause the second application to send the signed standard information and the identity identifier of the standard information to an authentication server, to cause the authentication server to register the standard information and the identity identifier of the standard information after the authentication server approves authentication of the first authentication information and approves authentication of the second authentication information according to the signed standard information. In some embodiments, a non-transitory computer-readable storage medium may store instructions that, when executed by a processor, cause the processor to perform the above-described information registration method.

According to another aspect, an information registration method may comprise: receiving, by an authentication server, a request for registering standard information from a second application; generating, according to the request for registering standard information, first authentication information and feeding the first authentication information back to the second application; receiving the signed standard information, an identity identifier of the standard information, and the first authentication information from the second application, wherein the signed standard information is signed by using second authentication information and sent to the second application by a first application; authenticating the first authentication information, and authenticating the second authentication information according to the signed standard information; and registering the standard information and the identity identifier of the standard information after approving the authentications of the first authentication information and the second authentication information. In some embodiments, a non-transitory computer-readable storage medium may store instructions that, when executed by a processor, cause the processor to perform the above-described information registration method.

According to another aspect, an information authentication method may comprise: sending a verification request for to-be-authenticated information to an authentication server; receiving first authentication information fed back by the authentication server; generating a to-be-authenticated information acquisition request, sending the to-be-authenticated information acquisition request and the first authentication information to a first application, and acquiring to-be-authenticated information and a to-be-authenticated identity identifier of the to-be-authenticated information returned by the first application after the first application approves authentication of the first authentication information; and sending the to-be-authenticated information, the to-be-authenticated identity identifier, and the first authentication information to the authentication server, to cause the authentication server to authenticate the first authentication information, the to-be-authenticated identity identifier, and the to-be-authenticated information, generate an authentication result, and feed the authentication result back to a second application. In some embodiments, a non-transitory computer-readable storage medium may store instructions that, when executed by a processor, cause the processor to perform the above-described information registration method.

According to another aspect, an information authentication method may comprise: receiving a to-be-authenticated information acquisition request from a second application and carrying first authentication information; and authenticating the first authentication information, and after the authentication is approved, sending the to-be-authenticated information and an identity identifier of the to-be-authenticated information to an authentication server via the second application, to cause the authentication server to authenticate the first authentication information, the to-be-authenticated identity identifier, and the to-be-authenticated information, generate an authentication result, and feed the authentication result back to the second application. In some embodiments, a non-transitory computer-readable storage medium may store instructions that, when executed by a processor, cause the processor to perform the above-described information registration method.

According to another aspect, an information authentication method may comprise: receiving, by an authentication server, a verification request for to-be-authenticated information from a second application; generating, according to the verification request, first authentication information and feeding the first authentication information back to the second application; receiving the to-be-authenticated information, a to-be-authenticated identity identifier of the to-be-authenticated information, and the first authentication information from the second application; and authenticating the first authentication information, the to-be-authenticated identity identifier, and the to-be-authenticated information, respectively, to generate an authentication result and feed the authentication result back to the second application. In some embodiments, a non-transitory computer-readable storage medium may store instructions that, when executed by a processor, cause the processor to perform the above-described information registration method.

According to another aspect, an information registration device may comprise: a registration request module configured to send a request for registering standard information to an authentication server; a receiving module configured to receive first authentication information fed back by the authentication server; an acquisition module configured to generate a standard information acquisition request, send the standard information acquisition request and the first authentication information to a first application, and acquire signed standard information and an identity identifier of the standard information that are returned by the first application after the first application approves authentication of the first authentication information, wherein the signed standard information is signed by the first application using second authentication information; and a sending module configured to send the signed standard information, the identity identifier of the standard information, and the first authentication information to the authentication server, to cause the authentication server to register the standard information and the identity identifier of the standard information after the authentication server approves authentication of the first authentication information and approves authentication of the second authentication information according to the signed standard information.

According to another aspect, an information registration device may comprise: a receiving module configured to receive first authentication information and a standard information acquisition request from a second application; and a signing module configured to authenticate the first authentication information, and after the authentication is approved, return the standard information signed by using second authentication information and return an identity identifier of the standard information back to the second application, to cause the second application to send the signed standard information and the identity identifier of the standard information to an authentication server, to cause the authentication server to register the standard information and the identity identifier of the standard information after the authentication server approves authentication of the first authentication information and approves authentication of the second authentication information according to the signed standard information.

According to another aspect, an information registration device may comprise: a registration request receiving module configured to receive a request for registering standard information from a second application; a feedback module configured to generate, according to the request for registering standard information, first authentication information and feed it back to the second application; a registration information receiving module configured to receive the signed standard information, an identity identifier of the standard information, and the first authentication information from the second application, wherein the signed standard information is signed by using second authentication information and sent to the second application by a first application; an authenticating module configured to authenticate the first authentication information, and authenticate the second authentication information according to the signed standard information; and a registering module configured to register the standard information and the identity identifier of the standard information after the authenticating module approving the authentications of the first authentication information and the second authentication information.

According to another aspect, an information authentication device may comprise: a registration request module configured to send a verification request for to-be-authenticated information to an authentication server; a receiving module configured to receive first authentication information fed back by the authentication server; an acquisition module configured to generate a to-be-authenticated information acquisition request, send the to-be-authenticated information acquisition request and the first authentication information to a first application, and acquire to-be-authenticated information and a to-be-authenticated identity identifier of the to-be-authenticated information returned by the first application after the first application approves authentication of the first authentication information; and a sending module configured to send the to-be-authenticated information, the to-be-authenticated identity identifier, and the first authentication information to the authentication server, to cause the authentication server to authenticate the first authentication information, the to-be-authenticated identity identifier, and the to-be-authenticated information, generate an authentication result, and feed the authentication result back to the second application.

According to another aspect, an information authentication device may comprise: a receiving module configured to receive a to-be-authenticated information acquisition request from a second application and carrying first authentication information; and a signing module configured to authenticate the first authentication information, and after the authentication is approved, send the to-be-authenticated information and an identity identifier of the to-be-authenticated information to an authentication server via the second application, to cause the authentication server to authenticate the first authentication information, the to-be-authenticated identity identifier, and the to-be-authenticated information, generate an authentication result, and feed the authentication result back to the second application.

According to another aspect, an information authentication device may comprise: an authentication request receiving module configured to receive a verification request for to-be-authenticated information from a second application; a feedback module configured to generate, according to the verification request, first authentication information and feed it back to the second application; an authentication information receiving module configured to receive the to-be-authenticated information, a to-be-authenticated identity identifier of the to-be-authenticated information, and the first authentication information from the second application; and an authenticating module configured to authenticate the first authentication information, the to-be-authenticated identity identifier, and the to-be-authenticated information, respectively, to generate an authentication result and feed the authentication result back to the second application.

Embodiments of the present application provide an information registration and authentication method and device. When a user needs to register standard information while using a business service, a business application (which may be referred to as a second application) initiates a request for registering standard information to an authentication server and receives first authentication information fed back by the authentication server. Then, the business application generates a standard information acquisition request, and sends the standard information acquisition request and the first authentication information to a security information application (which may be referred to as a first application). After the authentication of the first authentication information by the security information application is approved, the security information application uses its own second authentication information to sign the standard information, determines an identity identifier of the standard information, and then feeds the signed standard information and the identity identifier of the standard information back to the business application. Consequently, the business application sends the feedback from the security information application and the first authentication information to the authentication server, to cause the authentication server to register the standard information and the identity identifier thereof after the authentication. From the above manner, it can be seen that the first authentication information, as an identifier of the authentication server, enables the security information application to determine an identity of the standard information registering party; the return of the first authentication information of the authentication server enables the authentication server to determine whether the information is tampered with during transmission, while the return of the signed standard information of the authentication server enables the authentication server to determine whether the standard information is provided by a security information application in the terminal. Such a manner can effectively ensure that the authentication server can accurately identify standard information that has been tampered with during transmission, which effectively improves the security of standard information registration.

BRIEF DESCRIPTION OF THE DRAWINGS

The accompanying drawings herein are provided for further understanding of the present disclosure and constitute a part of the present disclosure. Illustrative embodiments of the present disclosure and the description thereof are used to explain the present disclosure and do not constitute improper limitations to the present disclosure. In the accompanying drawings:

FIG. 5 to FIG. 7 illustrate an information authentication method according to some embodiments of the present disclosure;

DETAILED DESCRIPTION

To make objectives, technical solutions, and advantages of the present disclosure clearer, the technical solutions of the present disclosure will be clearly and completely described below with reference to exemplary embodiments of the present disclosure and the accompanying drawings. Apparently, the described embodiments are merely some, rather than all, of the embodiments of the present disclosure. All other embodiments obtainable by a person skilled in the art on the basis of the embodiments of the present disclosure and without inventive effort shall be encompassed by the scope of the present disclosure.

As described above, when a service provider receives standard information for the first time, it is unable to accurately determine whether the standard information has been tampered with during transmission since it has not previously saved security information related to the standard information. If the service provider and a terminal have agreed on a series of authentication information in advance and use the authentication information to authenticate the standard information, however, it is feasible to identify whether the standard information has been tampered with during the transmission. On the basis of this, the following information registration and authentication methods are provided.

Figure 1:
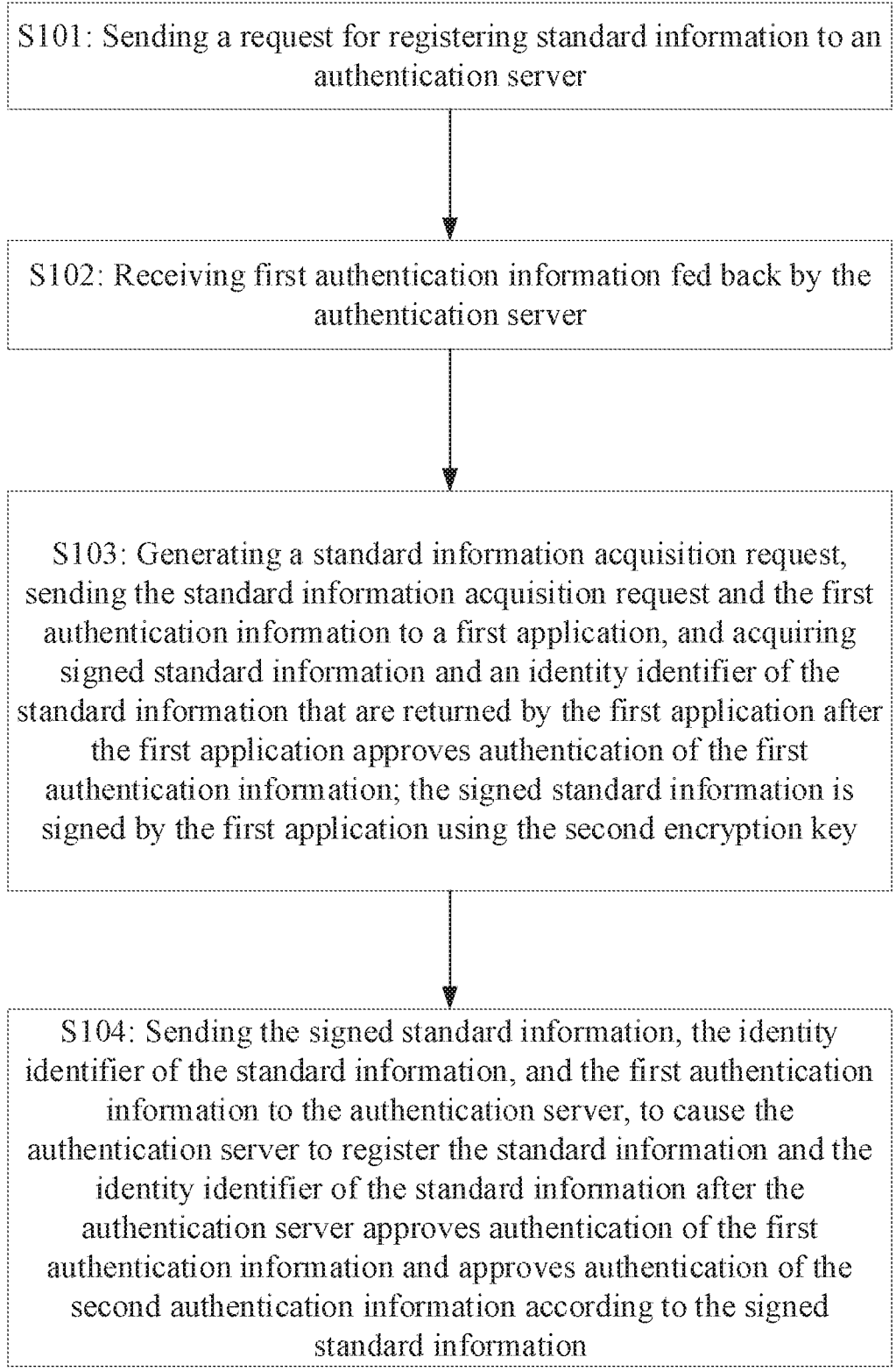
FIG. 1 to FIG. 3 illustrate an information registration method according to some embodiments of the present disclosure.

An information registration method is provided according to some embodiments of the present disclosure, and the information registration method may be implemented by a terminal (e.g., a business application in the terminal). As shown in FIG. 1, the method comprises the following steps:

S101: sending a request for registering standard information to an authentication server.

In an exemplary application scenario, when a user is using a business service of a relatively high security level (e.g., fingerprint payment service) provided in a business application (which may be referred to as a "second application" in this disclosure), the user is typically required to provide corresponding security information (e.g., fingerprint information). Especially when the user uses the business service for the first time, the user is typically required to input security information as the standard information, for comparison and verification against security information input by the user in subsequent uses of the business service.

In other words, when the user uses the business service for the first time, it is necessary to register standard information provided by the user in a corresponding authentication service via a business application. In the above step, therefore, a business application that runs inside a terminal may send the request for registering standard information to the authentication server.

Here, the terminal set forth in the present disclosure includes, but is not limited to, a mobile terminal, such as a cell phone, a tablet computer, and a smart watch, and may also be a computer terminal in some scenarios. The authentication server may be a server for security authentication in the back-end service system of a service provider, or a dedicated third-party server for security authentication.

S102: receiving first authentication information fed back by the authentication server.

The first authentication information is identification information fed back by the authentication server to the business application that sends the request for registering standard information, and is used to indicate the identity of the authentication server. In one embodiment, the first authentication information may comprise a certificate of the authentication service.

S103: generating a standard information acquisition request, sending the standard information acquisition request and the first authentication information to a security information application (which may be referred to as a "first application" in this disclosure), and acquiring signed standard information and an identity identifier of the standard information that are returned by the security information application after the security information application approves authentication of the first authentication information.

Here, the signed standard information is signed by the security information application using second authentication information.

In some embodiments, upon receiving the first authentication information fed back by the authentication server, the business application generates a standard information acquisition request to request the security information application in the terminal to provide standard information required for registration.

In some embodiments, the security information application in the present disclosure is a local application running in the terminal and used to provide security information (including the standard information) necessary for business services to the business application. However, the security information is a user's own key information. To prevent an unlawful operator from requesting the security information application for a user's security information, the security information application authenticates the identity of a user using the standard information. On the basis of this, when the business application sends the standard information acquisition request to the security information application, the business application also sends the first authentication information to the security information application. Then, the security information application authenticates the first authentication information to determine the identity of the authentication server, and provides the standard information only after the authentication of the first authentication information by the security information application is approved.

Considering that the standard information provided by the security information application may be tampered with during transmission in an actual application, the security information application performs a signing operation on the standard information before feeding back the standard information in the present application, so as to indicate that the standard information is from the security information application in the terminal. Also considering that the standard information is provided by the user, in the meantime, an identity identifier of the standard information can be determined, so as to indicate that the standard information is provided by the user. As such, there are two identifiers for the standard information fed by the security information application back to the business application, which are used, respectively, to indicate that the standard information is from the security information application in the terminal and that the standard information is provided by the user.

In one example, the security information application in the present application uses the second authentication information to sign the standard information to indicate that the standard information is from the security information application. In the present disclosure, the second authentication information can be second key information agreed between the authentication server and the security information application in the terminal (or the terminal itself) in advance, which is not specifically limited herein. The identity identifier of the standard information can also be determined by the security information application. In the present disclosure, the identity identifier of the standard information comprises identity key information of the standard information, and the identity key information is typically associated with account information of the user. In other words, one pair of identity key information uniquely corresponds to one piece of account information, which can also indicate that the standard information belongs to the user. Certainly, no specific limitation is made herein.

S104: sending the signed standard information, the identity identifier of the standard information, and the first authentication information to the authentication server, to cause the authentication server to register the standard information and the identity identifier of the standard information after the authentication server approves authentication of the first authentication information and approves authentication of the second authentication information according to the signed standard information.

Upon receiving the feedback by the security information application, the business application sends the signed standard information and the identity identifier of the standard information fed back by the security information application, together with the first authentication information from the authentication server, to the authentication server for authentication and registration.

Upon receiving the above information from the business application, the authentication server performs authentication on the received information. If the authentication is approved, it indicates that the standard information from the security information application is not tampered with during transmission, and then the authentication server can register the standard information and the identity identifier thereof. The registered standard information and the identity identifier thereof can then be used for authentication and identification of security information subsequently provided by the user.

With the above steps, when a user needs to register standard information while using a business service, a business application initiates a request for registering standard information to an authentication server and receives first authentication information fed back by the authentication server. Then, the business application generates a standard information acquisition request, and sends the standard information acquisition request and the first authentication information to a security information application. After the authentication of the first authentication information by the security information application is approved, the security information application uses its own second authentication information to sign the standard information, determines an identity identifier of the standard information, and then feeds the signed standard information and the identity identifier of the standard information back to the business application. Consequently, the business application sends the feedback from the security information application and the first authentication information to the authentication server, to cause the authentication server to register the standard information and the identity identifier thereof after the authentication. From the above method, the first authentication information, as an identifier of the authentication server, enables the security information application to determine an identity of the standard information registering party; the return of the first authentication information of the authentication server enables the authentication server to determine whether the information is tampered with during transmission, while the return of the signed standard information of the authentication server enables the authentication server to determine whether the standard information is provided by a security information application in the terminal. Such method can effectively ensure that the authentication server can accurately identify standard information that has been tampered with during transmission, which effectively improves the security of standard information registration.

With regard to the above first authentication information, the first authentication information is an identifier of the authentication server and used to identify the identity of the authentication server. For example, the authentication server's own certificate may be used as the first authentication information. Considering the security during transmission, the authentication server can use its own key information to perform a signing operation on its certificate. Then as an optional step, the above S102 of receiving first authentication information fed back by the authentication server comprises: receiving a certificate from the authentication server and signed by using the authentication server's own first encryption key, and using the signed certificate as the first authentication information.

In some scenarios of exemplary applications, moreover, a challenge code is further comprised in the first authentication information fed by the authentication server back to the business application. After the business application sends a request to the authentication server, the authentication server generates a unique challenge code that is carried in the first authentication information fed back to the business application. It can be considered that one challenge code corresponds to one business request. The adoption of challenge code can prevent replay attack.

Figure 2:
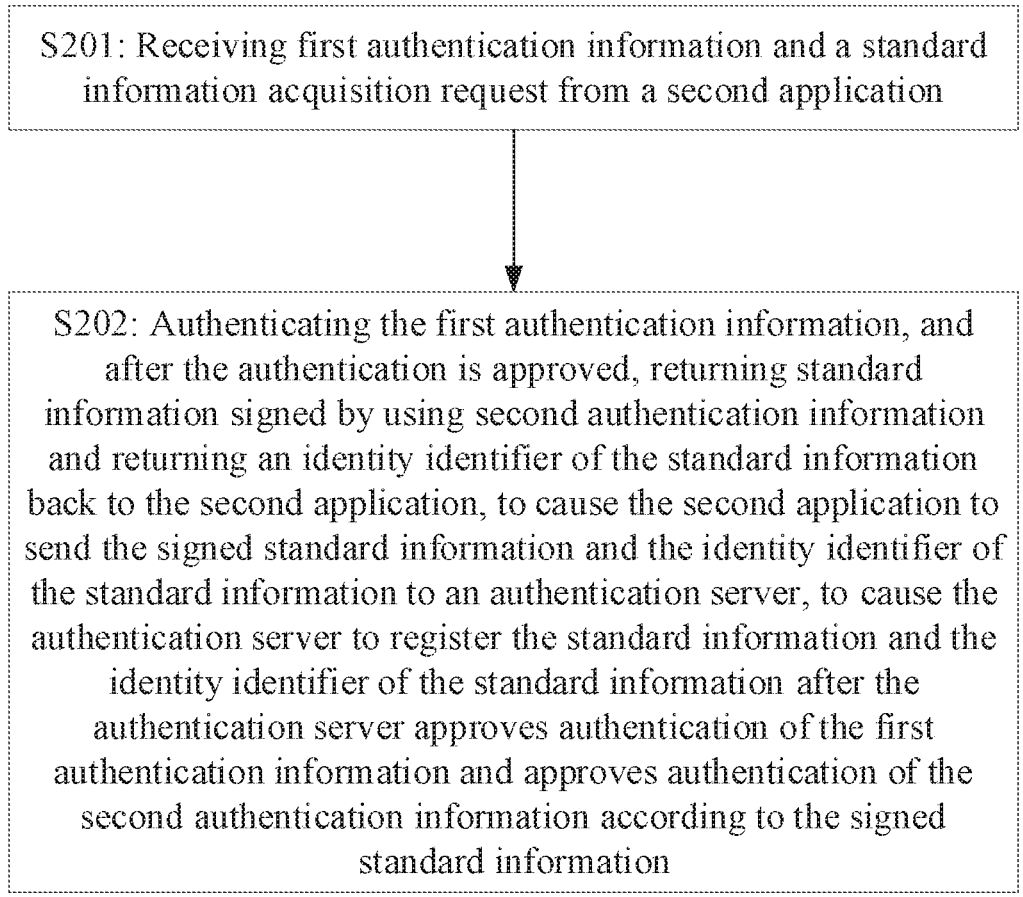

The content above is described from an angle of a business application in a terminal. With regard to a security information application that provides standard information, an information registration method is further provided in some embodiments of the present disclosure, and the information registration method may be implemented by a terminal (e.g., a security information application in the terminal). As shown in FIG. 2, the process comprises the following steps:

S201: receiving first authentication information and a standard information acquisition request from a business application.

The first authentication information and the standard information acquisition request in the present embodiment are the same as described above, which will not be repeated herein.

S202: authenticating the first authentication information, and after the authentication is approved, returning standard information signed by using second authentication information and returning an identity identifier of the standard information back to the business application, to cause the business application to send the signed standard information and the identity identifier of the standard information to an authentication server, to cause the authentication server to register the standard information and the identity identifier of the standard information after the authentication server approves authentication of the first authentication information and approves authentication of the second authentication information according to the signed standard information.

Upon receiving the first authentication information and the standard information acquisition request from the business application, the security information application would first authenticate the first authentication information to determine an identity of the standard information registering party. After the security information application determines the identity of the authentication server, the security information application may sign the standard information provided by the user, determine an identity identifier of the standard information, and feed the signed standard information and the identity identifier of the standard information back to the business application. Then, the business application sends a series of information fed back by the security information application, together with the first authentication information, to the authentication server for subsequent authentication by the authentication server. When the authentication is approved, moreover, the authentication server registers the standard information and the identity identifier of the standard information.

With the above steps, the identity of the authentication server can be identified with the first authentication information provided by the authentication server, and the authentication of the first authentication information by the security information application can prevent an unlawful operator from acquiring the standard information from the security information application. The manner in which the security information application signs the standard information provided by the user is used to indicate that the standard information is from the security information application, while the determination of the identity identifier of the standard information is used to indicate that the standard information is provided by the user. Apparently, the standard information fed by the security information application back to the business application comprises two identifiers. If the standard information is tampered with during transmission, the two identifiers of the standard information will both be changed. Such method can effectively reflect whether the standard information is tampered with during transmission, which ensures the security of the authentication server ultimately during registration.

The returning the standard information signed by using the second authentication information and the identity identifier of the standard information back to the business application comprises: receiving standard information input by the user, using the second authentication information to sign the standard information, determining an identity identifier of the standard information for the standard information, and returning the signed standard information and the identity identifier of the standard information back to the business application.

As described above, the identity identifier of the standard information in the present disclosure may comprise identity key information of the standard information, and the identity key information is typically associated with account information of the user. To ensure the security of the identity key information during transmission, the security information application may also use the second authentication information to sign the identity key information (i.e., the identity identifier of the standard information) in an optional method.

Similarly, as described above, the first authentication information can indicate the identity of the authentication server; while in one exemplary method of the present disclosure, the first authentication information comprises the authentication server's own certificate. In such a case, the authentication of the first authentication information comprises: using a first decryption key that matches the first encryption key of the authentication server to decrypt and authenticate the signed certificate.

With regard to the second authentication information, in one method according to some embodiments of the present disclosure, the second authentication information comprises second key information agreed with the authentication server in advance, wherein the second key information comprises a second encryption key and a second decryption key. In such a scenario, the using the second authentication information to sign the standard information comprises: using the second encryption key agreed with the authentication server in advance to sign the standard information.

In the case where the identity identifier of the standard information comprises identity key information of the standard information, the above second authentication information can be used to sign the identity key information.

Figure 3:
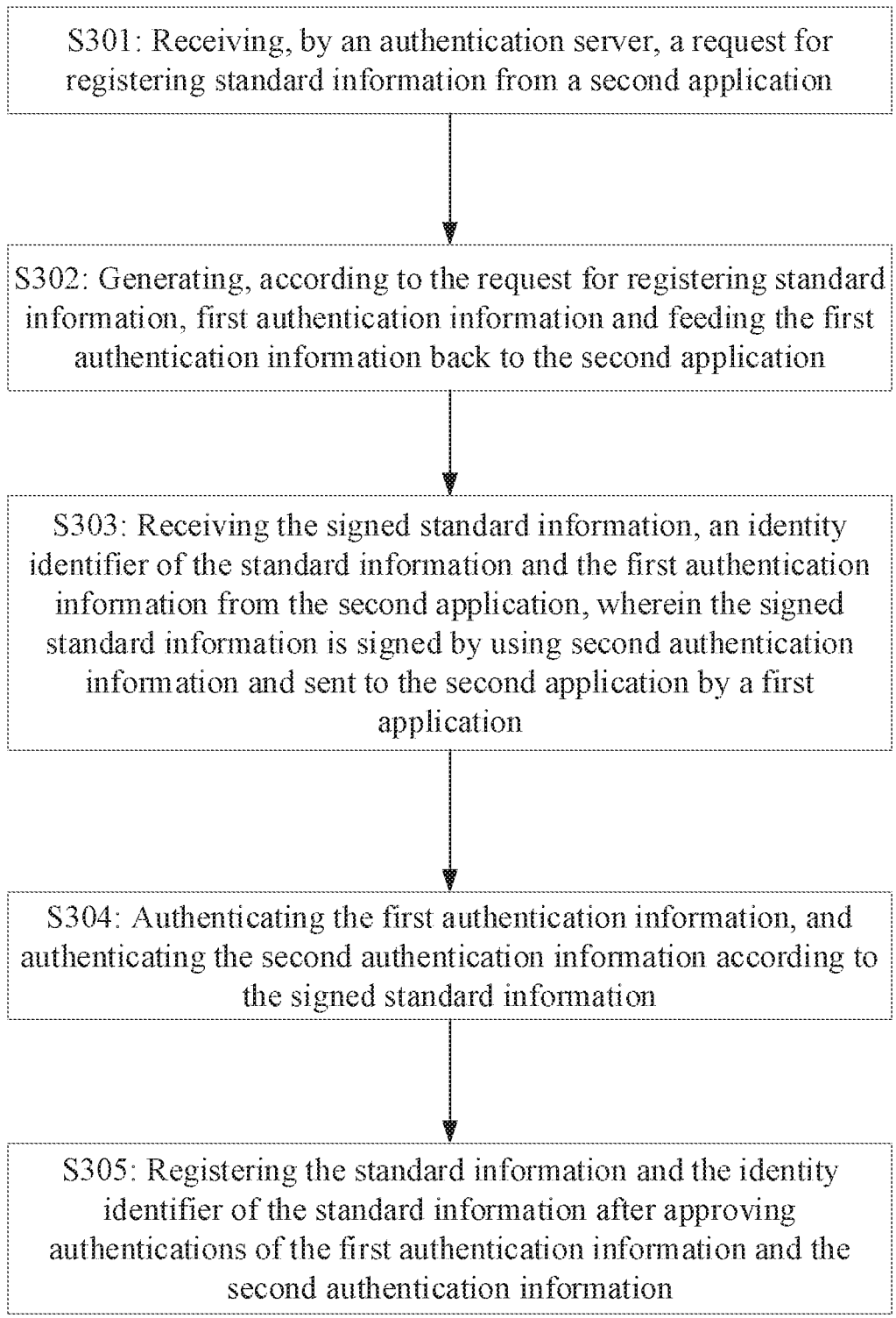

The description of the above method is from an angle of a security information application running in a terminal. With regard to an authentication server, an information registration method is further provided in some embodiments of the present disclosure, and the method may be implemented by a server (e.g., an authentication server). As shown in FIG. 3, the process comprises the following steps:

S301: receiving, by an authentication server, a request for registering standard information from a business application.

S302: generating, according to the request for registering standard information, first authentication information and feeding the first authentication information back to the business application;

S303: receiving the signed standard information, an identity identifier of the standard information, and the first authentication information from the business application, wherein the signed standard information is signed by using second authentication information and sent to the business application by a security information application;

S304: authenticating the first authentication information, and authenticating the second authentication information according to the signed standard information;

S305: registering the standard information and the identity identifier of the standard information after approving the authentications of the first authentication information and the second authentication information.

Similar to the above methods shown in FIG. 1 and FIG. 2, upon receiving a request for registering standard information from a business application, an authentication server feeds the first authentication information that can indicate the authentication server's own identity back to the business application, such that after the business application sends the request for registering standard information to a security information, the security information application can determine the identity of the authentication server according to the first authentication information, and then the security information application feeds the standard information signed by using the second authentication information and the identity identifier of the standard information back to the business application. Upon receiving the signed standard information and the first authentication information returned by the business application, the authentication server performs authentication on the first authentication information and performs authentication on the second authentication information according to the signed standard information. If the authentications are both approved, it indicates that the standard information is not tampered with during transmission, and then the authentication server registers the standard information and the identity identifier thereof for authentication and identification in subsequent processes.

As described above, in some embodiments, the authentication server's own certificate can effectively prove the identity of the authentication server. To ensure the validity of a certificate received by the security information application, on the other hand, the authentication server would typically sign its own certificate. The security information application can then identify whether the certificate has been tampered with during transmission. With regard to the above step S302, therefore, the generating, according to the request for registering standard information, first authentication information and feeding the first authentication information back to the business application comprises: invoking, according to the request for registering standard information, the authentication server's own certificate, using the authentication server's own first encryption key to sign the certificate as the first authentication information, and feeding the first authentication information back to the business application.

Similar to the content in the preceding method, in one embodiment, the authentication server may further comprise a challenge code in the first authentication information, use the authentication server's own first encryption key to sign the certificate as the first authentication information, and then send the same to the business application.

After the business application sends the signed standard information and the first authentication information to the authentication server, the authentication server performs authentication on the first authentication information and performs authentication on the second authentication information according to the signed standard information.

In one example, the performing authentication on the first authentication information comprises: using a first decryption key to decrypt and authenticate the first authentication information. The authentication server uses its own first decryption key to decrypt and authenticate the first authentication information. If the decrypted certificate (or challenge code) changes, it indicates that the certificate (or challenge code) has very likely been tampered with during transmission. Therefore, the authentication server determines that the authentication is not approved. If the decrypted certificate (or challenge code) does not change after the decryption by the authentication server, then the authentication is approved.

With regard to the second authentication information, the second authentication information comprises second key information agreed by the authentication server and the security information application in advance, which is similar to the content in the preceding method; wherein, the second key information comprises a second encryption key and a second decryption key. Moreover, the signed standard information is signed by the security information application using the second encryption key. In one embodiment, the authenticating the second authentication information according to the signed standard information comprises: according to the second key information agreed in advance, using the second decryption key agreed with the security information application in advance to decrypt the signed standard information so as to authenticate the second authentication information.

If the authentication server uses the agreed second decryption key to decrypt the signed standard information and obtain the standard information, it can be deemed that the standard information has not been tampered with during transmission and the authentication is approved. If unusable information is obtained after the decryption, it indicates that the signed information is not signed by the second encryption key agreed in advance, and it is very likely that the signed information is tampered information. As a result, the authentication is not approved.

In some embodiments, after the authentication by the authentication server is approved, the authentication server may register the standard information and the identity identifier of the standard information.

The above information registration methods shown in FIG. 1 to FIG. 3 enable the authentication server to effectively identify whether the standard information has been tampered with during transmission, which ensures a user not to be affected by an unlawful operator while using a business service.

The above information registration methods can be applied in any scenario in which a terminal acquires a business service via a business application. Moreover, the above authentication server may be a server having authentication functions in the back-end service system of a service provider. In exemplary application scenarios, a service provider capable of providing business services with relatively high security level requirements, such as payment services, transfer services, and the like, usually uses a network identity authentication architecture referred to as Internet Finance Authentication Alliance (IFAA) to realize identity authentication support required by business services with relatively high security level requirements. In other words, IFAA provides an authentication server to implement the above registration process.

In such a scenario, different equipment manufacturers would also adopt the identity authentication architecture provided by IFAA to provide interfaces or services required by identity authentication in terminals manufactured thereby.

To clearly describe the above registration methods, a detailed description will be provided with registration under the identity authentication architecture provided by IFAA as an example.

Figure 4:
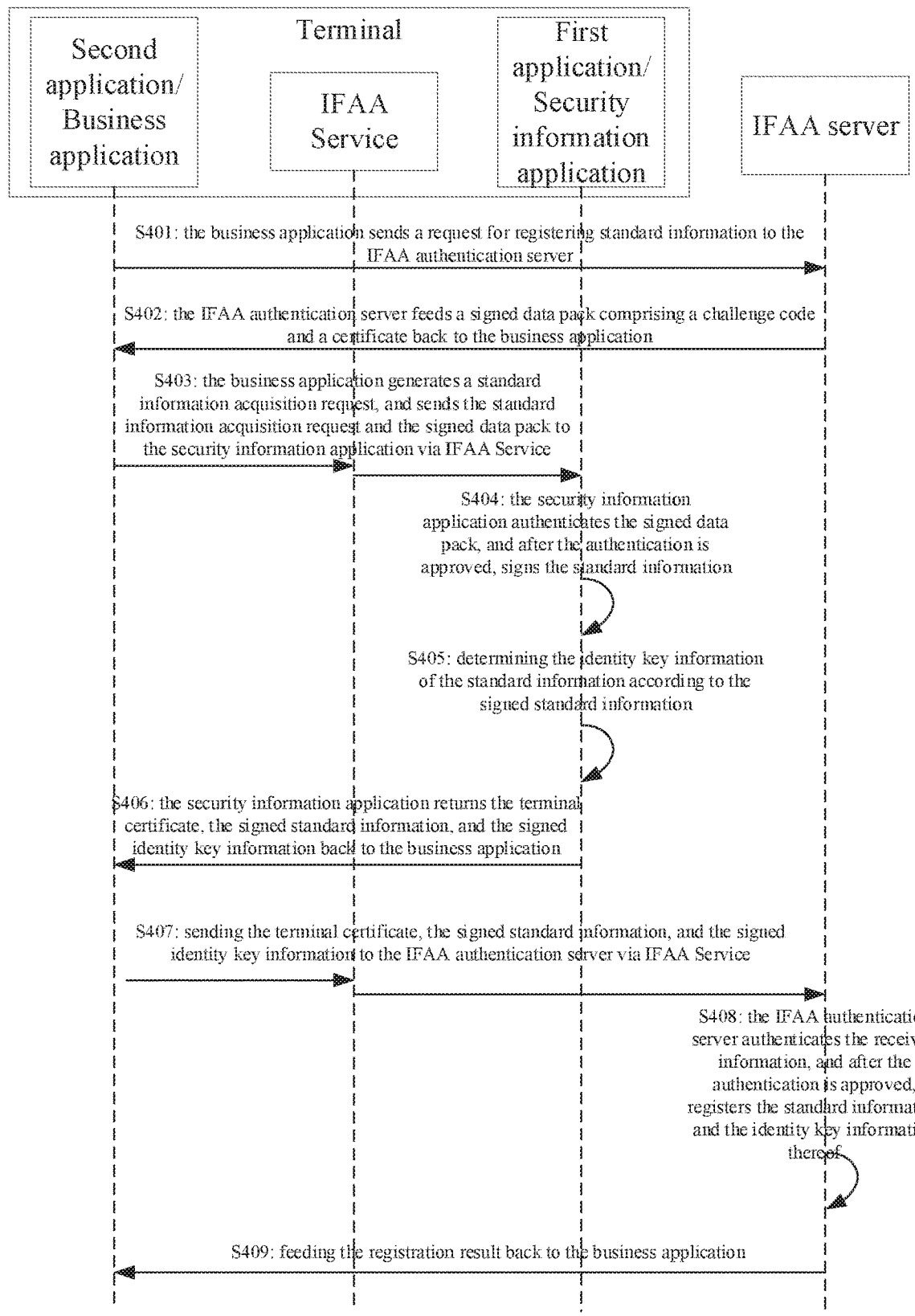
FIG. 4 illustrates an information registration method in an exemplary application scenario according to some embodiments of the present disclosure.

FIG. 4 illustrates an exemplary application method of registration between a terminal and an IFAA authentication server according to present embodiments, where a business application and a security information application run in the terminal. The business application can, as a business service access port of a service provider, provide various business services for users of the terminal, while the security information application is used to provide security information (which is the standard information in the present embodiment) required by the business application. The process shown in FIG. 4 comprises the following steps:

S401: the business application sends a request for registering standard information to the IFAA authentication server.

When a user uses a business service in the business application for the first time, it is necessary to register biological information of the user in the IFAA authentication server as standard information. At this moment, the business application sends a request for registering standard information to the IFAA authentication server.

S402: the IFAA authentication server feeds a signed data pack comprising a challenge code and a certificate back to the business application.

Here, the challenge code can prevent replay attack, and the certificate is used to indicate the IFAA authentication server's own identity. It can be considered that the signed data pack is the first authentication information in the above registration methods.

In addition, in this step, the IFAA authentication server uses IFAA S key information to sign the above data pack, and the IFAA S key information is generated by the IFAA authentication server itself. On the other hand, the IFAA authentication server's own certificate is signed by BIOM (Biometric Manage) key information, and the BIOM key information is used to indicate a type of service provider that provides the business service.

S403: the business application generates a standard information acquisition request, and sends the standard information acquisition request and the signed data pack to the security information application via IFAA Service.

Here, IFAA Service is a service provided by the IFAA identity authentication architecture disposed in the terminal. In one method for an exemplary application scenarios, the business application can call IFAA Service via IFAA SDK (a communication tool based on the IFAA identity authentication architecture), which is not specifically limited herein.

S404: the security information application authenticates the signed data pack, and after the authentication is approved, signs the standard information.

In some embodiments, the security information application first needs to decrypt the signed data pack (for example, the decryption can be performed by using the IFAA key information, which is not specifically limited herein); and after the decryption, the certificate in the authentication data pack (the BIOM key information can be used for decryption and authentication of the certificate) is used to authenticate whether it is IFAA registration standard information.

After the authentication is approved, the security information application acquires biological information input by the user as the standard information, and uses DA (Device Authenticator) key information to sign the standard information, wherein the DA key information is used to indicate the identity of the terminal (in one example, the DA key information can indicate the identity of the security information application, while the security information application is placed by the equipment manufacturer in the terminal. Therefore, the DA key information also indicates the identity of the terminal).

S405: determining the identity key information of the standard information according to the signed standard information.

In the present embodiment, the identity key information of the standard information is typically associated with account information used by the user in the business application to indicate the user to whom the standard information belongs. In an exemplary application, to generate the identity key information of the standard information, IFAA Service may call KeyMaster (a secure storage module) via KeyStore (a secure storage standard call interface in the REE environment), and KeyMaster generates the identity key information.

In some embodiments, to ensure security of the identity key information during transmission, the security information application can use the DA key information to sign the identity key information.

S406: the security information application returns the terminal certificate, the signed standard information, and the signed identity key information back to the business application.

S407: sending the terminal certificate, the signed standard information, and the signed identity key information to the IFAA authentication server via IFAA Service.

In some embodiments, the terminal certificate is also referred to as an authenticator certificate, which is provided by an equipment manufacturer participating in the IFAA identity authentication architecture in the equipment manufactured thereby. In other words, the terminal certificate can indicate whether the terminal uses the IFAA identity authentication architecture.

In a method according to the present embodiment, the above challenge code and the IFAA authentication server's own certificate can also be returned to the IFAA authentication server at the same time. As such, the IFAA authentication server can further authenticate the challenge code and the IFAA authentication server's own certificate.

S408: the IFAA authentication server authenticates the received information, and after the authentication is approved, registers the standard information and the identity key information thereof.

In some embodiments, the IFAA authentication server first authenticates the terminal certificate. For example, the IFAA authentication server may use the IFAA key information to decrypt the received information, and authenticate the validity of the terminal certificate. After the authentication is approved, the IFAA authentication server uses the DA key information to decrypt and authenticate the identity key information. If both are approved, it can be considered that the standard information has not been tampered with during transmission, and the IFAA authentication server registers the standard information and the identity key information thereof.

S409: feeding the registration result back to the business application.

From the above embodiments, in exemplary application scenarios, a variety of key information can be used to accurately determine whether the standard information is tampered with during transmission.

Figure 5:
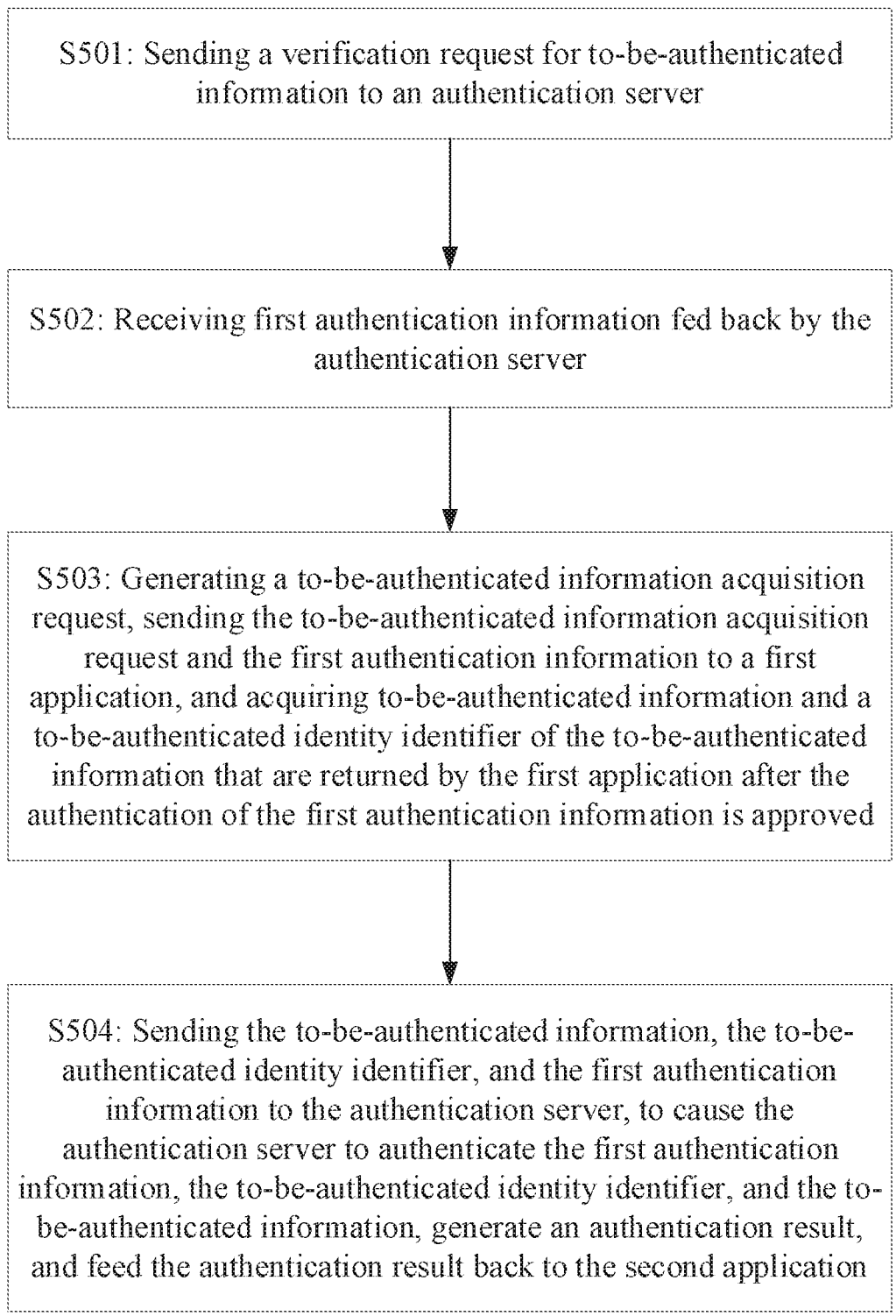

The above content describes a standard information registration method. After the standard information is registered, a user can use corresponding business services. When the user is using a business service, it is necessary to provide security information of the user. Correspondingly, the authentication server can perform authentication according to the security information provided by the user while using the business service. In some embodiments of the present disclosure, therefore, an information authentication method is further provided, and the information authentication method may be performed by a terminal (e.g., a business application in the terminal). As shown in FIG. 5, the method comprises the following steps:

S501: sending a verification request for to-be-authenticated information to an authentication server.

When the user is using a business service in the business application (e.g., fingerprint payment service), it is often necessary for the user to provide his/her own security information (e.g., fingerprint information) for comparison with the previously registered standard information. At this moment, the business application acquires security information of the user as to-be-authenticated information, and subsequently sends to the authentication server for authentication and verification.

In the above circumstance, the business application sends a verification request for to-be-authenticated information to the authentication server.

S502: receiving first authentication information fed back by the authentication server.

Similar to the above registration method, the first authentication information indicates the identity of the authentication server, which will not be repeated herein.

S503: generating a to-be-authenticated information acquisition request according to the first authentication information, sending the to-be-authenticated information acquisition request to a security information application, and acquiring to-be-authenticated information and a to-be-authenticated identity identifier of the to-be-authenticated information provided by the security information application.

Similarly, the security information application determines the identity of the party to be authenticated according to the first authentication information. After the identity of the party to be authenticated is determined to be valid and the authentication is approved, the security information application further returns the to-be-authenticated information and to-be-authenticated identity identifier thereof provided by the user back to the business application.

In some embodiments, unlike the above registration method, it is not necessary to use second authentication information to sign the to-be-authenticated information.

S504: sending the to-be-authenticated information, the to-be-authenticated identity identifier, and the first authentication information to the authentication server, to cause the authentication server to authenticate the first authentication information, the to-be-authenticated identity identifier, and the to-be-authenticated information, generate an authentication result, and feed the authentication result back to the business application.

From the above content, it can be identified, through the first authentication information and the to-be-authenticated identity identifier, whether the to-be-authenticated information has been tampered with during transmission. After the authentication is approved, the authentication server may perform authentication on the to-be-authenticated information.

In some embodiments of the present disclosure, an information authentication method is further provided, and the method may be implemented by a terminal (e.g., a security information application in the terminal). As shown in FIG. 6, the method comprises the following steps:

S601: receiving a to-be-authenticated information acquisition request from a business application and carrying first authentication information.

S602: sending, according to a standard information acquisition request carrying the first authentication information, the to-be-authenticated information and an identity identifier of the to-be-authenticated information to an authentication server via the business application, to cause the authentication server to authenticate the first authentication information, the to-be-authenticated identity identifier, and the to-be-authenticated information, generate an authentication result, and feed the authentication result back to the business application.

With regard to the above step S602, the sending, according to a standard information acquisition request carrying the first authentication information, the to-be-authenticated information and an identity identifier of the to-be-authenticated information back to the business application comprises: authenticating the first authentication information carried in the standard information acquisition request, and after the authentication is approved, receiving to-be-authenticated information input by the user; identifying the standard information to which the to-be-authenticated information belongs, determining the identity standard matching the standard information to be to-be-authenticated identity identifier of the to-be-authenticated information, and returning the to-be-authenticated information and the to-be-authenticated identity identifier of the to-be-authenticated information back to the business application.

Figure 7:
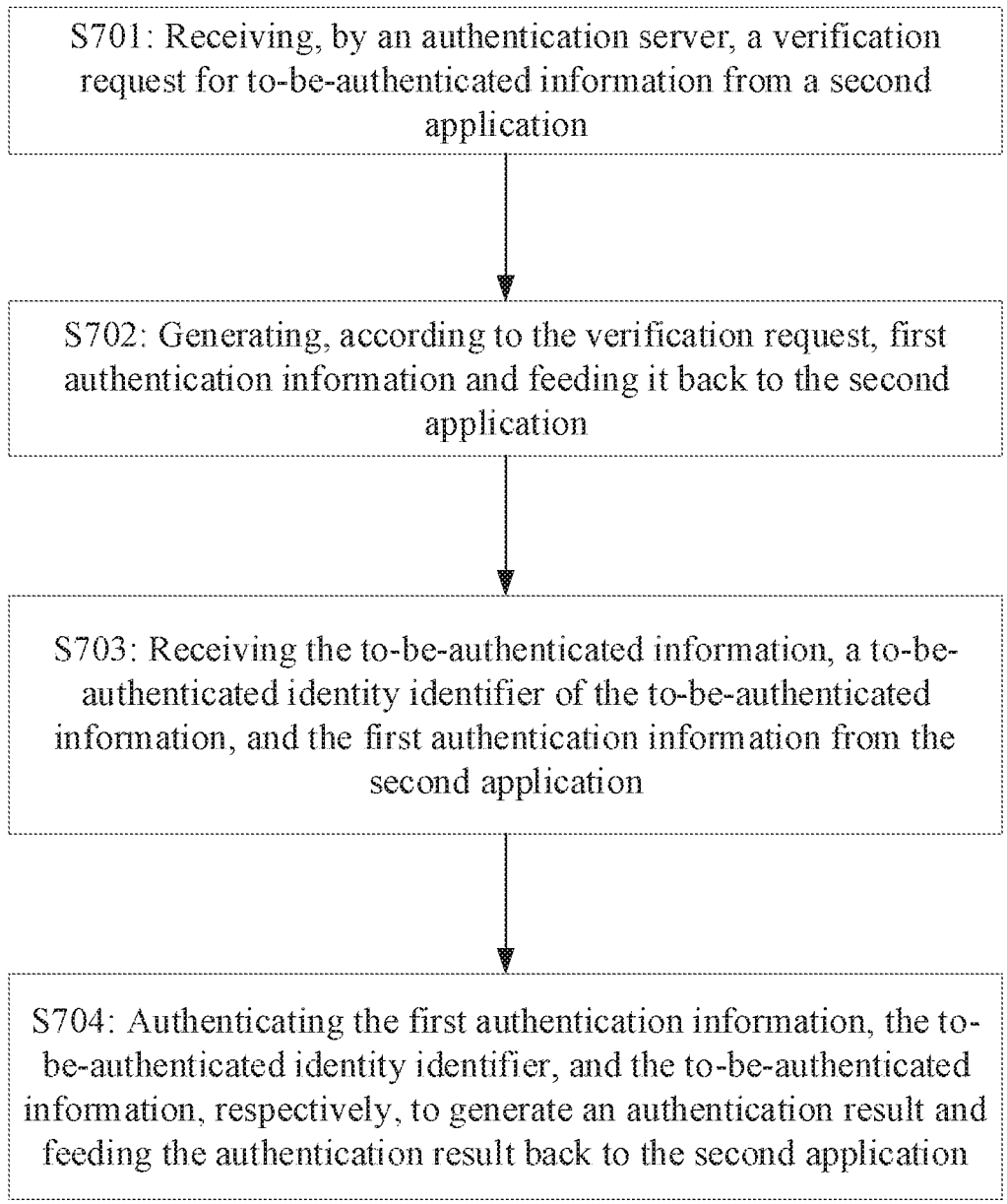

In some embodiments of the present disclosure, an information authentication method is further provided, and as shown in FIG. 7, the method comprises the following steps:

S701: receiving, by an authentication server, a verification request for to-be-authenticated information from a business application.

S702: generating, according to the verification request, first authentication information and feeding the first authentication information back to the business application.

S703: receiving the to-be-authenticated information, an identity identifier of the to-be-authenticated information, and the first authentication information from the business application.

S704: authenticating the first authentication information, the identity identifier, and the to-be-authenticated information, respectively, to generate an authentication result and feeding the authentication result back to the business application.

In some embodiments, with regard to the above step S704, the authentication server authenticates the information from the business application, respectively. In one example, the authenticating the first authentication information, the identity identifier, and the to-be-authenticated information, respectively comprises: with regard to the first authentication information, using a first decryption key of the authentication server to decrypt the first authentication information, and authenticating the decrypted certificate; with regard to the identity identifier, determining, according to the identity identifier of registered standard information, whether the identity identifier matches the identity identifier of registered standard information; and comparing the to-be-authenticated information with the registered standard information for authentication.

In exemplary application scenarios, the authentication server can feed back a notice of failure if the authentication of any information by the authentication server is not approved during an authentication process, and feed back a notice of success only when all information approves authentication by the authentication server. In one example, the generating an authentication result and feeding the authentication result back to the business application comprises: with regard to the first authentication information, if the authentication is approved, authenticating the to-be-authenticated information and to-be-authenticated identity identifier; otherwise, returning a notice of authentication failure; with regard to the identity identifier, if the authentication is approved, authenticating the to-be-authenticated information; otherwise, returning a notice of authentication failure; and with regard to the to-be-authenticated information, if the authentication is approved, returning a notice of success; otherwise, returning a notice of authentication failure.

Corresponding to the above registration process, a detailed description will be provided with the authentication under the identity authentication architecture provided by IFAA as an example.

Figure 8:
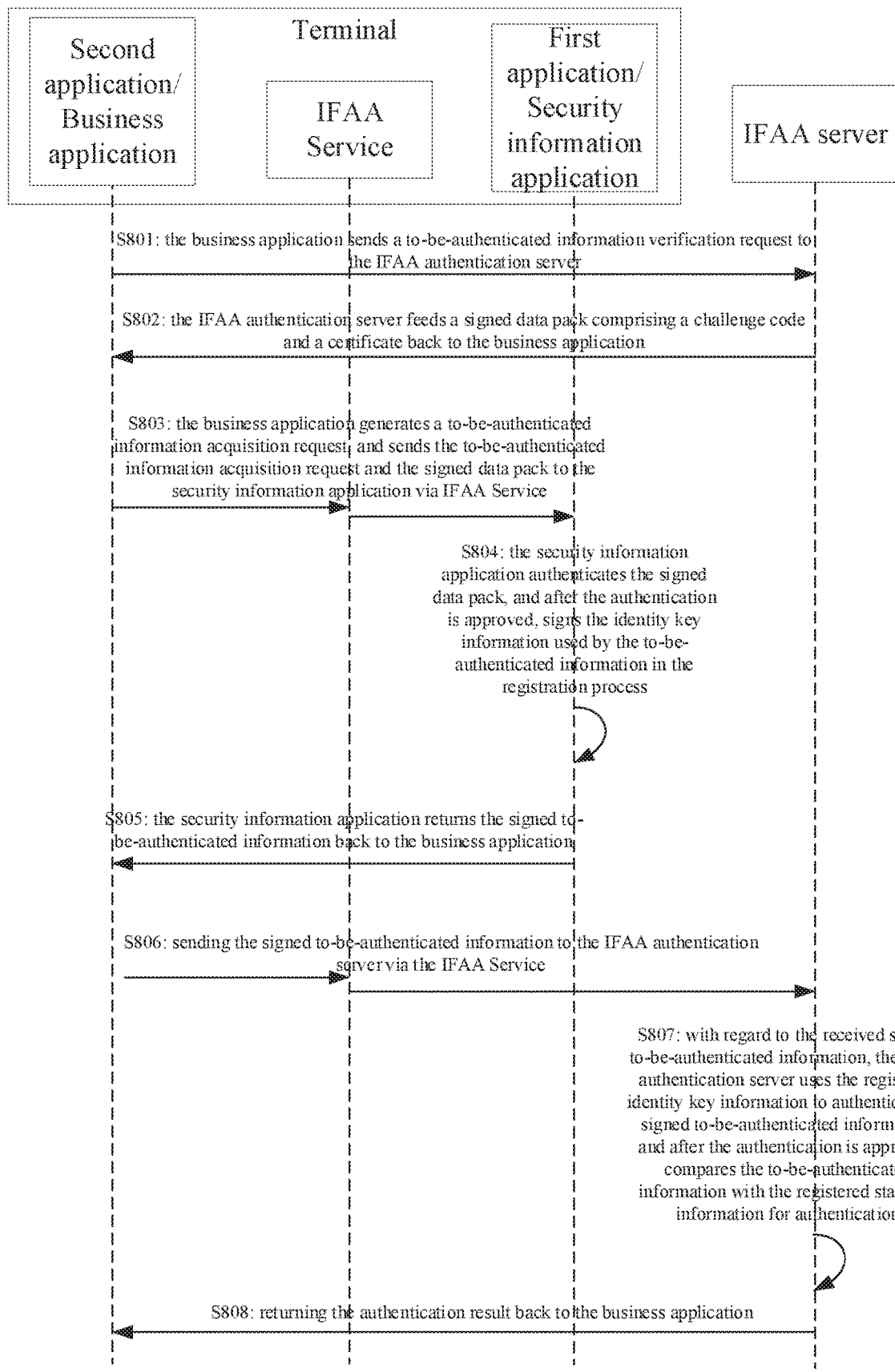
FIG. 8 illustrates an information authentication process in an exemplary application scenario according to some embodiments of the present disclosure.

FIG. 8 illustrates an exemplary application method of authentication between a terminal and an IFAA authentication server according to some embodiments. The illustrated process comprises the following steps:

S801: the business application sends a to-be-authenticated information verification request to the IFAA authentication server.

S802: the IFAA authentication server feeds a signed data pack comprising a challenge code and a certificate back to the business application.

S803: the business application generates a to-be-authenticated information acquisition request, and sends the to-be-authenticated information acquisition request and the signed data pack to the security information application via IFAA Service.

S804: the security information application authenticates the signed data pack, and after the authentication is approved, signs the identity key information used by the to-be-authenticated information in the registration process.

S805: the security information application returns the signed to-be-authenticated information back to the business application.

S806: sending the signed to-be-authenticated information to the IFAA authentication server via the IFAA Service.

S807: with regard to the received signed to-be-authenticated information, the IFAA authentication server uses the registered identity key information to authenticate the signed to-be-authenticated information, and after the authentication is approved, compares the to-be-authenticated information with the registered standard information for authentication.

S808: returning the authentication result back to the business application.

Figure 9:
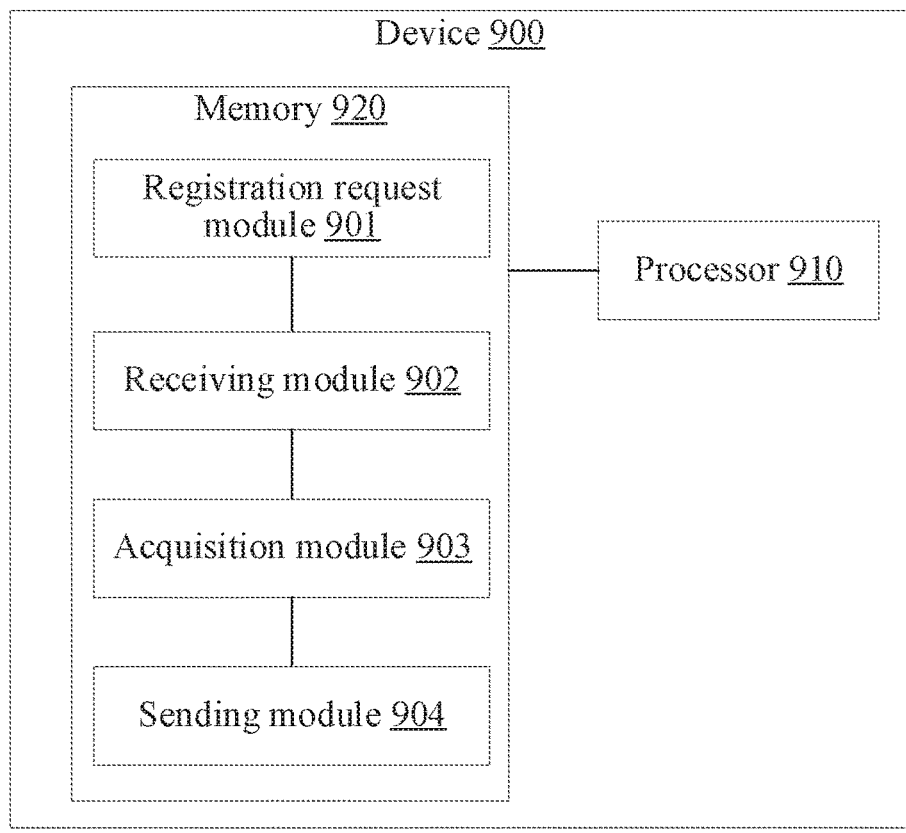
FIG. 9 to FIG. 11 are structural schematic diagrams of an information registration device according to some embodiments of the present disclosure.

The information transmission method is described above by various embodiments. By the same token, embodiments of the present disclosure further provide an information registration device 900. As shown in FIG. 9, the device 900 comprises a processor 910 and a memory 920 (e.g., a non-transitory computer-readable storage medium) storing instructions that, when executed by the processor, cause the device 900 to perform various steps and methods described herein. In some embodiments, the instructions may comprise various software modules such as: a registration request module 901 configured to send a request for registering standard information to an authentication server; a receiving module 902 configured to receive first authentication information fed back by the authentication server; an acquisition module 903 configured to generate a standard information acquisition request, send the standard information acquisition request and the first authentication information to a security information application, and acquire signed standard information and an identity identifier of the standard information that are returned by the security information application after the security information application approves authentication of the first authentication information, wherein the signed standard information is signed by the security information application using second authentication information; and a sending module 904 configured to send the signed standard information, the identity identifier of the standard information, and the first authentication information to the authentication server, to cause the authentication server to register the standard information and the identity identifier of the standard information after the authentication server approves authentication of the first authentication information and approves authentication of the second authentication information according to the signed standard information.

The receiving module 902 is configured to receive a certificate from the authentication server and signed by using the authentication server's own first encryption key, and use the signed certificate as the first authentication information.

Figure 10:
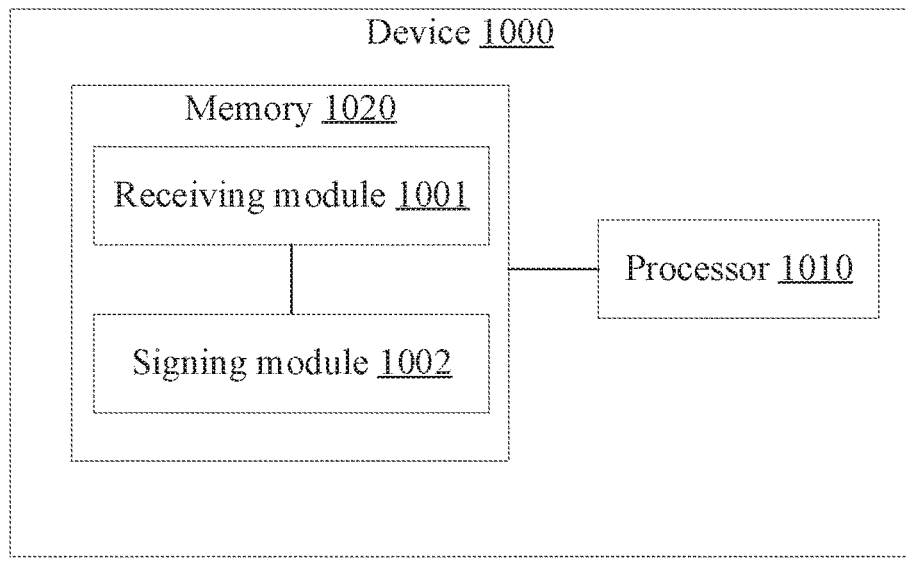

As shown in FIG. 10, embodiments of the present disclosure further provide an information registration device 1000, and the device comprises a processor 1010 and a memory 1020 (e.g., a non-transitory computer-readable storage medium) storing instructions that, when executed by the processor, cause the device 1000 to perform various steps and methods described herein. In some embodiments, the instructions may comprise various software modules such as: a receiving module 1001 configured to receive first authentication information and a standard information acquisition request from a business application; and a signing module 1002 configured to authenticate the first authentication information, and after the authentication is approved, return the standard information signed by using second authentication information and return an identity identifier of the standard information back to the business application, to cause the business application to send the signed standard information and the identity identifier of the standard information to an authentication server, to cause the authentication server to register the standard information and the identity identifier of the standard information after the authentication server approves authentication of the first authentication information and approves authentication of the second authentication information according to the signed standard information.

The signing module 1002 is configured to receive standard information input by the user, use the second authentication information to sign the standard information, determine an identity identifier of the standard information for the standard information, and return the signed standard information and the identity identifier of the standard information back to the business application.

In some embodiments, the identity identifier of the standard information comprises identity key information of the standard information, the identity key information being associated with account information of the user.

In a scenario where the first authentication information comprises a signed certificate of the authentication server, the signing module 1002 is configured to use a first decryption key that matches the first encryption key of the authentication server to decrypt and authenticate the signed certificate.

The second authentication information comprises second key information agreed with the authentication server in advance, wherein the second key information comprises a second encryption key and a second decryption key. The signing module 1002 is configured to use the second encryption key agreed with the authentication server in advance to sign the standard information.

Figure 11:
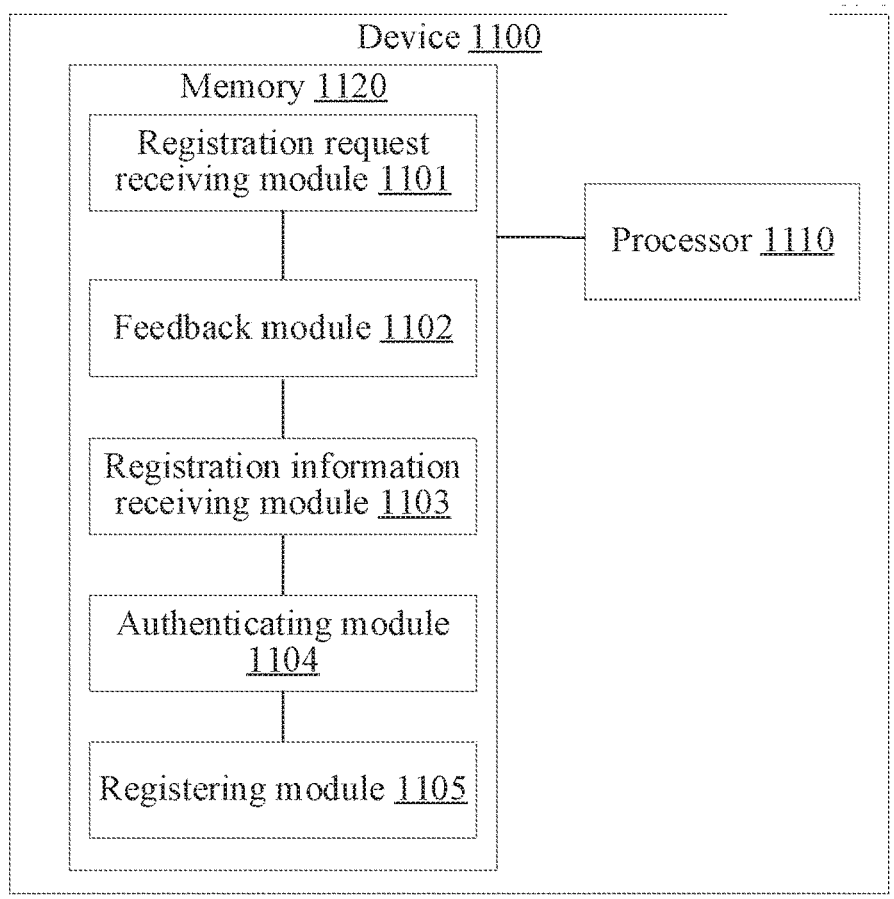

As shown in FIG. 11, embodiments of the present disclosure further provide an information registration device 1100, and the device 1100 comprises a processor 1110 and a memory 1120 (e.g., a non-transitory computer-readable storage medium) storing instructions that, when executed by the processor, cause the device 1100 to perform various steps and methods described herein. In some embodiments, the instructions may comprise various software modules such as: a registration request receiving module 1101 configured to receive a request for registering standard information from a business application; a feedback module 1102 configured to generate, according to the request for registering standard information, first authentication information and feed it back to the business application; a registration information receiving module 1103 configured to receive the signed standard information, an identity identifier of the standard information, and the first authentication information from the business application, wherein the signed standard information is signed by using second authentication information and sent to the business application by a security information application; an authenticating module 1104 configured to authenticate the first authentication information, and authenticate the second authentication information according to the signed standard information; and a registering module 1105 configured to register the standard information and the identity identifier of the standard information after the authenticating module 1104 approving the authentications of the first authentication information and the second authentication information.

In one example, the feedback module 1102 is configured to invoke, according to the request for registering standard information, the authentication server's own certificate, use the authentication server's own first encryption key to sign the certificate as the first authentication information, and feed it back to the business application.

The authenticating module 1104 is configured to use a first decryption key to decrypt and authenticate the first authentication information.

The second authentication information comprises second key information agreed by the authentication server and the security information application in advance, wherein the second key information comprises a second encryption key and a second decryption key; the signed standard information is signed by the security information application using the second encryption key. In such a scenario, the authenticating module 1104 is configured to use, according to the second key information agreed in advance, the second decryption key agreed with the security information application in advance to decrypt the signed standard information so as to authenticate the second authentication information.

Figure 12:
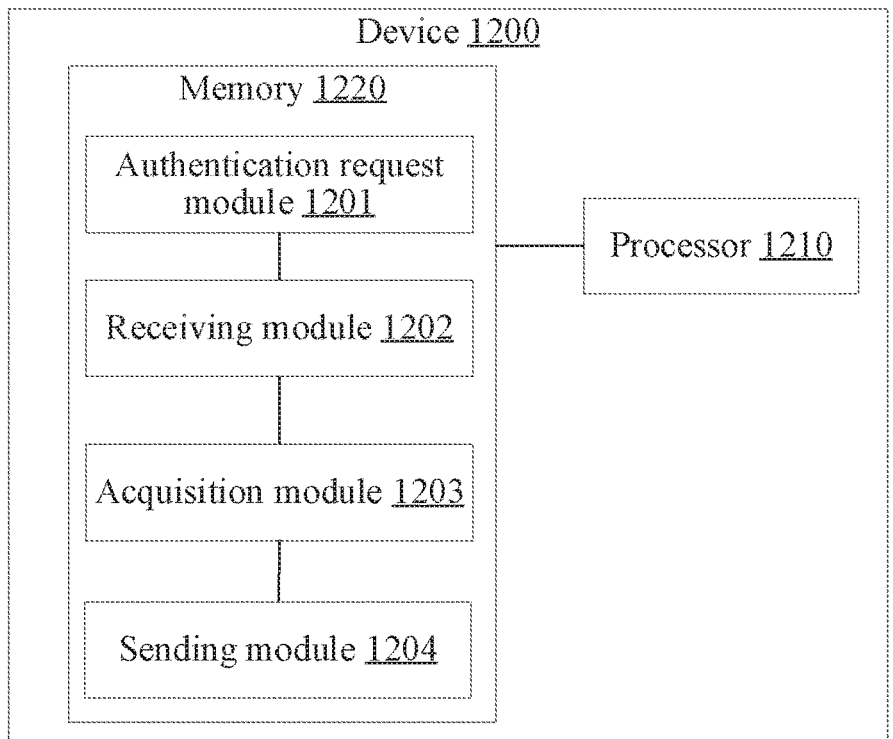
FIG. 12 to FIG. 14 are structural schematic diagrams of an information authentication device according to some embodiments of the present disclosure.

As shown in FIG. 12, embodiments of the present application further provide an information authentication device 1200, and the device 1200 comprises a processor 1210 and a memory 1220 (e.g., a non-transitory computer-readable storage medium) storing instructions that, when executed by the processor, cause the device 1200 to perform various steps and methods described herein. In some embodiments, the instructions may comprise various software modules such as: a registration request module 1201 configured to send a verification request for to-be-authenticated information to an authentication server; a receiving module 1202 configured to receive first authentication information fed back by the authentication server; an acquisition module 1203 configured to generate a to-be-authenticated information acquisition request, send the to-be-authenticated information acquisition request and the first authentication information to a security information application, and acquire to-be-authenticated information and a to-be-authenticated identity identifier of the to-be-authenticated information returned by the security information application after the security information application approves authentication of the first authentication information; and a sending module 1204 configured to send the to-be-authenticated information, the to-be-authenticated identity identifier, and the first authentication information to the authentication server, to cause the authentication server to authenticate the first authentication information, the to-be-authenticated identity identifier, and the to-be-authenticated information, generate an authentication result, and feed the authentication result back to the business application.

Figure 13:
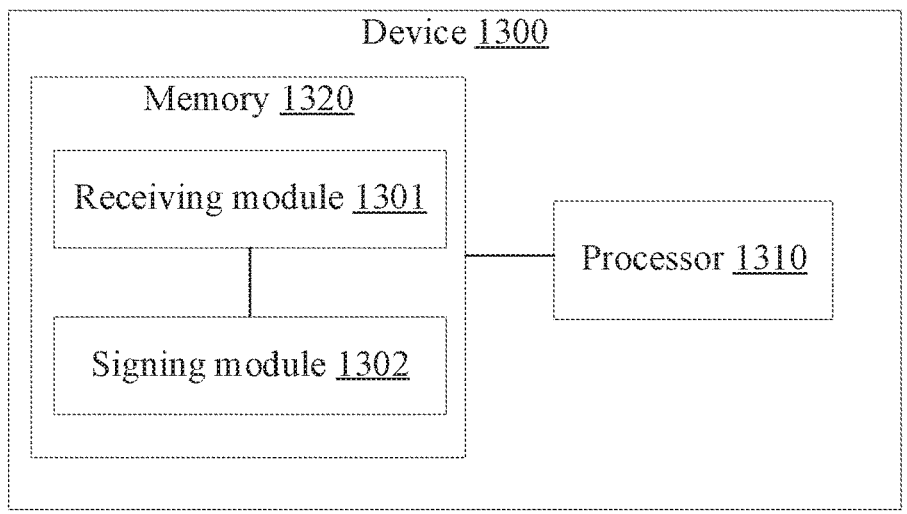

As shown in FIG. 13, embodiments of the present application further provide an information authentication device 1300, and the device 1300 comprises a processor 1310 and a memory 1320 (e.g., a non-transitory computer-readable storage medium) storing instructions that, when executed by the processor, cause the device 1300 to perform various steps and methods described herein. In some embodiments, the instructions may comprise various software modules such as: a receiving module 1301 configured to receive a to-be-authenticated information acquisition request from a business application and carrying first authentication information; and a signing module 1302 configured to authenticate the first authentication information, and after the authentication is approved, send the to-be-authenticated information and an identity identifier of the to-be-authenticated information to an authentication server via the business application, to cause the authentication server to authenticate the first authentication information, the to-be-authenticated identity identifier, and the to-be-authenticated information, generate an authentication result, and feed the authentication result back to the business application.

In one example, the signing module 1302 is configured to authenticate the first authentication information carried in the standard information acquisition request, and after the authentication is approved, identify the standard information to which the to-be-authenticated information belongs, determine the identity standard matching the standard information to be to-be-authenticated identity identifier of the to-be-authenticated information, and return the to-be-authenticated information and the to-be-authenticated identity identifier of the to-be-authenticated information back to the business application.

Figure 14:
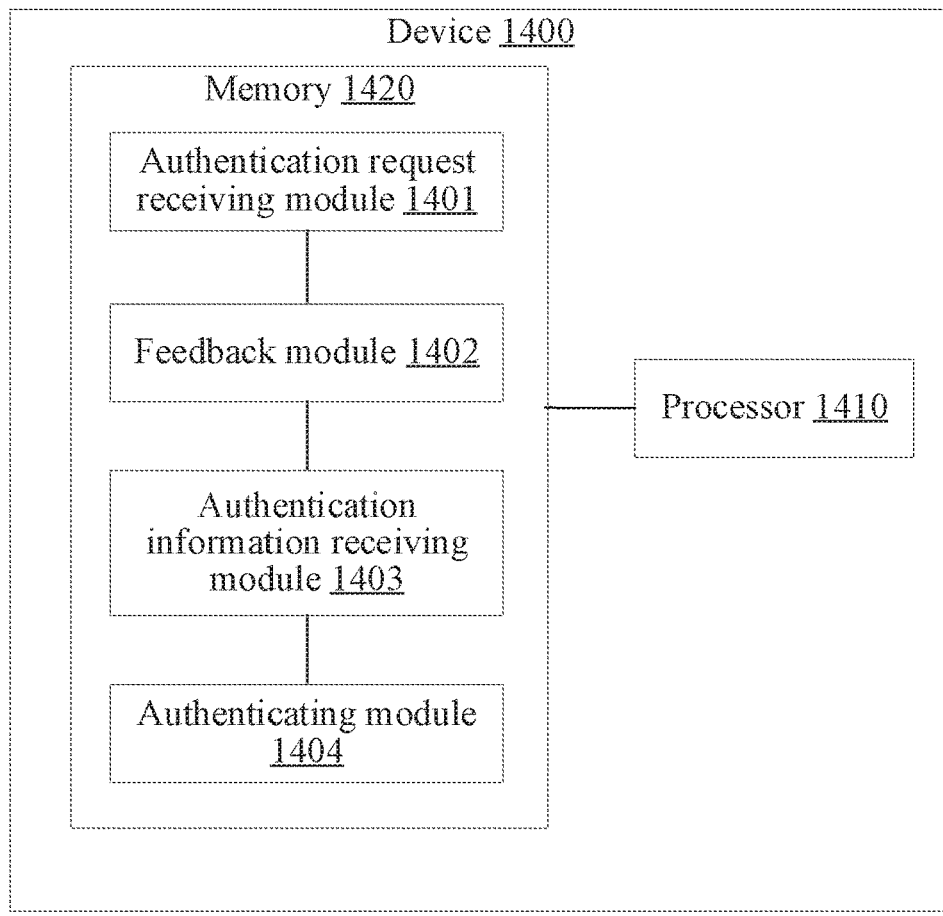

As shown in FIG. 14, embodiments of the present disclosure further provide an information authentication device 1400, and the device 1400 comprises a processor 1410 and a memory 1420 (e.g., a non-transitory computer-readable storage medium) storing instructions that, when executed by the processor, cause the device 1400 to perform various steps and methods described herein. In some embodiments, the instructions may comprise various software modules such as: an authentication request receiving module 1401 configured to receive a verification request for to-be-authenticated information from a business application; a feedback module 1402 configured to generate, according to the verification request, first authentication information and feed it back to the business application; an authentication information receiving module 1403 configured to receive the to-be-authenticated information, a to-be-authenticated identity identifier of the to-be-authenticated information, and the first authentication information from the business application; and an authenticating module 1404 configured to authenticate the first authentication information, the to-be-authenticated identity identifier, and the to-be-authenticated information, respectively, to generate an authentication result and feed the same back to the business application.

The authenticating module 1404 is configured to, with regard to the first authentication information, use a first decryption key of the information authentication device to decrypt the first authentication information, and authenticate the decrypted certificate; with regard to the to-be-authenticated identity identifier, determine, according to the identity identifier of registered standard information, whether the to-be-authenticated identity identifier matches the identity identifier of registered standard information; and compare the to-be-authenticated information with the registered standard information for authentication.

The authenticating module 1404 is configured to, with regard to the first authentication information, if the authentication is approved, authenticate the to-be-authenticated information and to-be-authenticated identity identifier; otherwise, return a notice of authentication failure; with regard to the identity identifier, if the authentication is approved, authenticate the to-be-authenticated information; otherwise, return a notice of authentication failure; and with regard to the to-be-authenticated information, if the authentication is approved, return a notice of success; otherwise, return a notice of authentication failure.

In a typical configuration, a computation device includes one or more Central Processing Units (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including," "comprising," or any other variants thereof intend to encompass a non-exclusive inclusion, such that a process, method, commodity, or device comprising a series of elements not only comprises these elements, but also comprises other elements that are not specifically listed, or further comprises elements that are inherent to the process, method, commodity or device. When there is no further restriction, elements defined by the statement "comprising one . . . " does not exclude that a process, method, commodity, or device comprising the above elements further comprises additional identical elements.

A person skilled in the art should understand that the embodiments of the present disclosure may be provided as a method, a system, or a computer program product. Therefore, disclosed systems and devices may be each implemented as a complete hardware, a complete software, or a combination of both software and hardware. Moreover, the disclosed methods may be implemented by systems and devices in the form of a computer program product implemented on one or more computer usable storage media (including, but not limited to, a magnetic disk memory, CD-ROM, an optical memory, and the like) comprising computer usable program codes therein.

That is, the various systems (e.g., terminal, server, authentication server) described herein may each comprise one or more processors and a non-transitory computer-readable storage medium (e.g., memory) storing instructions that, when executed by the processors, cause the corresponding system to perform the corresponding method described herein. In some embodiments, the various modules may be implemented as software modules and stored as the instructions in the memory.

The disclosed embodiments are not used to limit the scope of the present disclosure. To a person skilled in the art, the present disclosure may have various modifications and changes. Any modification, equivalent substitution or improvement made within the spirit and principle of the present disclosure shall be encompassed by the claims of the present disclosure.

What is claimed is:

1. An information registration method for a terminal, comprising:

sending a request for registering standard information to an authentication server;

receiving first authentication information fed back by the authentication server, wherein the first authentication information comprises a certificate of the authentication server signed by the authentication server's own first encryption key, and using the signed certificate as the first authentication information;

generating a standard information acquisition request, sending the standard information acquisition request and the first authentication information to a first application executing on the terminal, and acquiring signed standard information and an identity identifier of the standard information that are returned by the first application after the first application approves authentication of the first authentication information, wherein the signed standard information is signed by the first application using second authentication information, wherein the second authentication information indicates the identity of the first application and the identity of the terminal; and sending the signed standard information, the identity identifier of the standard information, and the first authentication information to the authentication server, to cause the authentication server to register the standard information and the identity identifier of the standard information after the authentication server approves authentication of the first authentication information and approves authentication of the second authentication information according to the signed standard information.

2. The method of claim 1, wherein:

the method is implemented by a terminal comprising the first application and a second application;

the step of sending the request for registering standard information to the authentication server comprises sending, by the second application, the request for registering standard information to the authentication server;

the step of receiving first authentication information fed back by the authentication server comprises receiving, by the second application, the first authentication information fed back by the authentication server;

the step of generating the standard information acquisition request comprises generating, by the second application, the standard information acquisition request;

the step of sending the standard information acquisition request and the first authentication information to the first application comprises sending, by the second application, the standard information acquisition request and the first authentication information to the first application;

the step of acquiring signed standard information and the identity identifier of the standard information that are returned by the first application comprises acquiring, by the second application, the signed standard information and the identity identifier of the standard information that are returned by the first application; and the step of sending the signed standard information, the identity identifier of the standard information, and the first authentication information to the authentication server comprises sending, by the second application, the signed standard information, the identity identifier of the standard information, and the first authentication information to the authentication server.

3. The method of claim 2, wherein prior to the step of acquiring signed standard information and the identity identifier of the standard information that are returned by the first application, the method further comprises:

receiving, by the first application, the first authentication information and the standard information acquisition request from the second application;

authenticating, by the first application, the first authentication information; and after the authentication is approved, returning, by the first application, standard information signed by using second authentication information and returning, by the first application, the identity identifier of the standard information back to the second application.

4. The method according to claim 3, further comprising:
sending, by the second application, a verification request for to-be-authenticated information to the authentication server;
receiving, by the second application, third authentication information fed back by the authentication server;
generating, by the second application, a to-be-authenticated information acquisition request, sending the to-be-authenticated information acquisition request and the third authentication information to the first application, and acquiring to-be-authenticated information and a to-be-authenticated identity identifier of the to-be-authenticated information returned by the first application after the first application approves authentication of the third authentication information; and
sending, by the second application, the to-be-authenticated information, the to-be-authenticated identity identifier, and the third authentication information to the authentication server, to cause the authentication server to authenticate the third authentication information, the to-be-authenticated identity identifier, and the to-be-authenticated information, generate an authentication result, and feed the authentication result back to a second application.

5. The method according to claim 4, wherein prior to the step of acquiring to-be-authenticated information and the to-be-authenticated identity identifier of the to-be-authenticated information returned by the first application after the first application approves authentication of the third authentication information, the method further comprises:
receiving, by the first application, the to-be-authenticated information acquisition request from the second application,
authenticating, by the first application, the third authentication information, and
after the authentication is approved, sending, by the first application, the to-be-authenticated information and an identity identifier of the to-be-authenticated information to the authentication server via the second application.

6. An information registration method for a terminal, comprising:
receiving, at a first application executing on the terminal, first authentication information and a standard information acquisition request from a second application, wherein the first authentication information comprises a certificate of an authentication server signed by the authentication server's own first encryption key; and
authenticating the first authentication information, and after the authentication is approved, returning standard information signed by using second authentication information and returning an identity identifier of the standard information back to the second application, to cause the second application to send the signed standard information, the first authentication information, and the identity identifier of the standard information to the authentication server, wherein the second authentication information indicates an identity of the first application and an identity of the terminal, and to cause the authentication server to register the standard information and the identity identifier of the standard information after the authentication server approves authentication of the first authentication information and approves authentication of the second authentication information according to the signed standard information.

7. The method according to claim 6, wherein the step of returning standard information signed by using second authentication information and the identity identifier of the standard information back to the second application comprises:
receiving standard information input by a user;
using the second authentication information to sign the standard information, and determining the identity identifier of the standard information for the standard information; and
returning the signed standard information and the identity identifier of the standard information back to the second application.

8. The method according to claim 6, wherein:
the step of authenticating the first authentication information comprises: using a first decryption key that matches a first encryption key of the authentication server to decrypt and authenticate the signed certificate.

9. The method according to claim 7, wherein the identity identifier of the standard information comprises identity key information of the standard information, and the identity key information is associated with account information of the user.

10. The method according to claim 7, wherein:
the second authentication information comprises second key information agreed by the authentication server in advance, wherein the second key information comprises a second encryption key and a second decryption key; and
the step of using the second authentication information to sign the standard information comprises: using the second encryption key agreed by the authentication server in advance to sign the standard information.

11. The method according to claim 6, further comprising:
receiving a to-be-authenticated information acquisition request from the second application and carrying third authentication information; and
authenticating the third authentication information, and after the authentication is approved, sending the to-be-authenticated information and an identity identifier of the to-be-authenticated information to an authentication server via the second application, to cause the authentication server to authenticate the third authentication information, the to-be-authenticated identity identifier, and the to-be-authenticated information, generate an authentication result, and feed the authentication result back to the second application.

12. The method according to claim 11, wherein the step of returning, according to the standard information acquisition request carrying the third authentication information, the to-be-authenticated information and the identity identifier of the to-be-authenticated information back to the second application comprises:
authenticating the third authentication information carried in the standard information acquisition request;
after the authentication is approved, receiving to-be-authenticated information input by a user;
identifying the standard information to which the to-be-authenticated information belongs, and determining the identity standard matching the standard information to be to-be-authenticated identity identifier of the to-be-authenticated information; and
returning the to-be-authenticated information and the to-be-authenticated identity identifier of the to-be-authenticated information back to the second application.

13. An information registration method, comprising:
receiving, by an authentication server, a request for registering standard information from a second application executing on a terminal;
generating, according to the request for registering standard information, first authentication information and feeding the first authentication information back to the second application, wherein the first authentication information comprises the authentication server's own certificate signed by the authentication server's own first encryption key;
receiving the signed standard information, an identity identifier of the standard information, and the first authentication information from the second application, wherein the signed standard information is signed by using second authentication information and sent to the second application by a first application, and wherein the second authentication information indicates an identity of the first application and an identity of the terminal;
authenticating the first authentication information, and authenticating the second authentication information according to the signed standard information; and
registering the standard information and the identity identifier of the standard information after approving the authentications of the first authentication information and the second authentication information.

14. The method according to claim 13, wherein the step of generating, according to the request for registering standard information, first authentication information and feeding the first authentication information back to the second application comprises:
using the authentication server's own first encryption key to sign the certificate as the first authentication information, and feeding the first authentication information back to the second application.

15. The method according to claim 13, wherein the step of authenticating the first authentication information comprises:
using a first decryption key to decrypt and authenticate the first authentication information.

16. The method according to claim 13, wherein the second authentication information comprises second key information agreed by the authentication server and the first application in advance, wherein the second key information comprises a second encryption key and a second decryption key; the signed standard information is signed by the first application using the second encryption key; and
the step of authenticating the second authentication information according to the signed standard information comprises: according to the second key information agreed in advance, using the second decryption key agreed with the first application in advance to decrypt the signed standard information so as to authenticate the second authentication information.

17. The method according to claim 13, further comprising:
receiving, by the authentication server, a verification request for to-be-authenticated information from the second application;
generating, according to the verification request, third authentication information and feeding the third authentication information back to the second application;
receiving the to-be-authenticated information, a to-be-authenticated identity identifier of the to-be-authenticated information, and the third authentication information from the second application; and
authenticating the third authentication information, the to-be-authenticated identity identifier, and the to-be-authenticated information, respectively, to generate an authentication result and feeding the authentication result back to the second application.

18. The method according to claim 17, wherein the step of authenticating the third authentication information, the identity identifier, and the to-be-authenticated information, respectively comprises:
with regard to the third authentication information, using a third decryption key of the authentication server to decrypt the third authentication information, and authenticating the decrypted certificate;
with regard to the to-be-authenticated identity identifier, determining, according to the identity identifier of registered standard information, whether the to-be-authenticated identity identifier matches the identity identifier of registered standard information; and
comparing the to-be-authenticated information with the registered standard information for authentication.

19. The method according to claim 18, wherein the step of generating the authentication result and feeding the authentication result back to the second application comprises:
with regard to the third authentication information, if the authentication is approved, authenticating the to-be-authenticated information and to-be-authenticated identity identifier;
otherwise, returning a notice of authentication failure;
with regard to the identity identifier, if the authentication is approved, authenticating the to-be-authenticated information; if the authentication fails, returning a notice of authentication failure; and
with regard to the to-be-authenticated information, if the authentication is approved, returning a notice of success; if the authentication fails, returning a notice of authentication failure.

* * * * *